US006365658B1

(12) United States Patent
Kjellqvist et al.

(10) Patent No.: US 6,365,658 B1
(45) Date of Patent: Apr. 2, 2002

(54) POLYMER COMPOSITIONS

(75) Inventors: Jerker B. L. Kjellqvist, Wädenswil (CH); Brian W. Walther, Lake Jackson; Wenbin Liang, Sugar Land, both of TX (US); Roland Karlsson, Ronneby (SE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/374,098

(22) Filed: Aug. 12, 1999

(51) Int. Cl.[7] .................................................. C08K 5/06
(52) U.S. Cl. ........................ 524/377; 524/269; 524/463; 524/506; 524/520; 524/515; 525/98; 525/185
(58) Field of Search ............................... 524/515, 269, 524/377, 463, 506, 520; 525/98, 185

(56) References Cited

U.S. PATENT DOCUMENTS

| 5,460,818 | A | | 10/1995 | Park et al. .................. 426/415 |
| 5,739,200 | A | | 4/1998 | Cheung et al. |
| 6,063,872 | A | * | 5/2000 | Nichols et al. ............. 525/241 |

FOREIGN PATENT DOCUMENTS

| DE | 197 19 593 | 1/1999 | |
| EP | 0 893 245 | 1/1999 | |
| WO | WO 96/07681 | 3/1996 | |
| WO | 98/10015 | 3/1998 | ........... C08L/23/02 |
| WO | 98/10160 | 3/1998 | ........... E04F/15/10 |
| WO | WO 99/10395 | 3/1999 | |

* cited by examiner

Primary Examiner—Peter D. Mulcahy

(57) ABSTRACT

A polymer composition comprising, based on the total weight of A), B), C) and D), A) from about 10 to 89.99 percent of a substantially random interpolymer comprising in polymerized form i) from about 35 to about 89.5 mole percent of one or more α-olefin monomers and ii) from about 65 to about 10.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s);

B) from about 10 to about 75 percent of one or more polyolefins selected from the group consisting of I) propylene polymers and II) high density polyethylenes; and C) from 0.01 to about 10 percent of a non-ionic lubricant; and D) from 0 to about 60 percent of a substantially random interpolymer comprising in polymerized form i) from about 50 to about 99.5 mole percent of one or more α-olefin monomers and ii) from about 50 to about 0.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s) with the proviso that the molar percentage of the one or more α-olefin monomers in the substantially random interpolymer D) is at least about 10 mole percent higher than the molar percentage of the one or more α-olefin monomers in the substantially random interpolymer A).

26 Claims, No Drawings

POLYMER COMPOSITIONS

BACKGROUND OF THE INVENTION

This invention concerns novel polymer compositions, molded articles that are at least partially made from the novel polymer compositions and processes for preparing the molded articles.

Polymeric materials find wide use in a large variety of articles, such as furniture, cars, car bumpers, boats, floor coverings, wall coverings, household machines, such as vacuum cleaners, toys, bottles or shoes, such as ski boots, skates or boots. Polymeric materials which are useful in the top layer of such articles should possess a wide variety of properties. One important property in the resistance to scuffing. "Scuffing" is a surface deformation caused by sliding contacts between two surfaces resulting in surface marks. For example, when a polymeric material used for vacuum cleaners, boats, floor coverings or shoes has a low resistance to scuffing, surface marks become visible when the vacuum cleaner or boat occasionally bumps into other objects, when people walk on the floor or upon contact of the left and right shoe. Such surface or scuff marks are highly undesirable.

For molded goods, such as boats or interior and exterior car parts, another important property is a high gloss and the fast achievement of gloss upon polishing. By "polishing" as used herein is meant the polishing of a surface, using a moist or, preferably, a dry cleaning pad.

Good polishing properties decrease the maintenance costs.

In WO-98/10160 floor and wall coverings comprising substantially random interpolymers of ethylene and styrene are described. Unfortunately, substantially random interpolymers of ethylene and styrene generally do not have a good resistance to scuffing.

Accordingly, it is an object of the present invention to provide novel polymer compositions which can be molded to articles with good scuffing resistance and/or with high 10 gloss after polishing.

SUMMARY OF THE INVENTION

One aspect of the present invention is a polymer composition which comprises, based on the total weight of A), B), C) and D), A) from about 10 to 89.99 percent of a substantially random interpolymer comprising in polymerized form i) from about 35 to about 89.5 mole percent of one or more α-olefin monomers and ii) from about 65 to about 10.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s);

B) from about 10 to about 75 percent of one or more polyolefins selected from the group consisting of I) propylene polymers and II) high density polyethylenes; and C) from 0.01 to about 10 percent of a non-ionic lubricant; and D) from 0 to about 60 percent of a substantially random interpolymer comprising in polymerized form i) from about 50 to about 99.5 mole percent of one or more α-olefin monomers and ii) from about 50 to about 0.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s) with the proviso that the molar percentage of the one or more α-olefin monomers in the substantially random interpolymer D) is at least about 10 mole percent higher than the molar percentage of the one or more α-olefin monomers in the substantially random interpolymer A).

Another aspect of the present invention is a molded article which is at least made partially made from a polymer composition of the present invention.

Yet another aspect of the present invention is the use of the polymer composition of the present invention for producing a molded article.

Yet another aspect of the present invention is process for preparing a molded article wherein the polymer composition of the present invention is processed to the molded article by calendering, compression molding, injection-molding, extrusion, extrusion-coating or blow-molding.

DETAILED DESCRIPTION OF THE INVENTION

The polymer composition of the present invention comprises, based on the total weight of A), B), C) and D), A) from about 10 to 89.99 percent, preferably from about 20 to 79.95 percent, more preferably from about 25 to about 79.8 percent, of the above-mentioned substantially random interpolymer A);

B) from about 10 to about 75 percent, preferably from about 20 to about 60 percent, more preferably from about 20 percent to about 45 percent, of one or more polyolefins selected from the group consisting of I) propylene polymers and II) high density polyethylenes; and C) from 0.01 to about 10 percent, preferably from 0.05 to about 8 percent, more preferably from about 0.2 to about 6 percent, of a non-ionic lubricant; and D) from 0 to about 60 percent, preferably from 0 to about 45 percent, more preferably from 0 to about 35 percent, of the above-mentioned substantially random interpolymer D).

The percentages of A), B), C) and D) are weight percentages.

It is understood that the polymer composition may comprise more than one type of substantially random interpolymers A), more than one type of components B), more than one type of non-ionic lubricants C) and/or more than one type of substantially random interpolymers D). In this case the total amount of interpolymers A), the total amount of components B), the total amount of lubricants C) and the total amount of interpolymers D) are within the ranges indicated above. If the polymer composition comprises two or more types of interpolymers A) and one or more types of interpolymers D), each interpolymer D) should be chosen such that its molar α-olefin content is at least about 10 mole percent higher, preferably at least about 15 mole percent higher, than the molar percentage of the one or more α-olefin monomers in each interpolymer A).

If the polymer composition comprises three or more substantially random interpolymers, the interpolymer with the lowest α-olefin content is the interpolymer A) and the interpolymer with the highest α-olefin content is the interpolymer D), provided that these polymers meet the definitions of interpolymers A) and D). If some or all of the remaining polymer(s) is/are within the definition of the interpolymer A) and within the definition of the interpolymer D), such polymer(s) is/are defined as being an interpolymer A).

The most preferred polymer composition for achieving good resistance to scuffing comprises from about 25 to about 45 percent of component A), from about 20 to about 45 percent of component B), from about 0.2 to about 6 percent of component C), and from about 25 to about 45 percent of component D), based on the total weight of A), B), C) and D).

The most preferred polymer composition for achieving good polishing properties comprises from about 40 to about 79.8 percent of component A), from about 20 to about 45 percent of component B), from about 0.2 to about 6 percent of component C), and from 0 to about 10 percent of component D), based on the total weight of A), B), C) and D).

The term "interpolymer" is used herein to indicate a polymer wherein at least two different monomers are polymerized to make the interpolymer.

The term "substantially random" in the substantially random interpolymers A) and D) as used herein generally means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer resulting from polymerizing one or more α-olefin monomers and one or more vinyl or vinylidene aromatic monomers, and optionally other polymerizable ethylenically unsaturated monomer(s), does not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" is meant a substantially random interpolymer produced from the above-mentioned monomers.

Suitable α-olefin monomers which are useful for preparing the substantially random interpolymer include, for example, α-olefin monomers containing from 2 to about 20, preferably from 2 to about 12, more preferably from 2 to about 8 carbon atoms. Particularly suitable are ethylene, propylene, butene-1, 4-methyl-l-pentene, hexene-1 or octene-1 or ethylene in combination with one or more of propylene, butene-1, 4-methyl-1-pentene, hexene-1 or octene-1. Most preferred are ethylene or a combination of ethylene with $C_{3-8}$-α-olefins. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the substantially random interpolymer include, for example, those represented by the following formula I

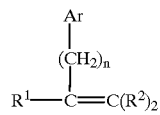

(formula I)

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and par-methylstyrene, t-butyl styrene, the ring halogenated styrenes, such as chlorostyrene, para-vinyl toluene or mixtures thereof. A more preferred aromatic monovinyl monomer is styrene.

By the term "sterically hindered aliphatic or cycloaliphatic vinyl or vinylidene monomers", it is generally meant addition polymerizable vinyl or vinylidene monomers corresponding to the formula:

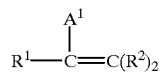

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon 20 atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to about 20 carbon atoms and having a linear aliphatic structure, such as propylene, butene-1, hexene-1 and octene-1, are not considered as sterically hindered aliphatic monomers. Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

If the substantially random interpolymer contains a vinyl or vinylidene aromatic monomer and a sterically hindered aliphatic or cycloaliphatic monomer in polymerized form, the weight ratios between these two monomer types is generally not critical. Preferably, the substantially random interpolymer contains either a) one or more vinyl or vinylidene aromatic monomers or b) one or more sterically hindered aliphatic or cycloaliphatic monomers. Vinyl or vinylidene aromatic monomers are preferred over sterically hindered aliphatic or cycloaliphatic monomers.

The most preferred substantially random interpolymers are interpolymers of ethylene and styrene and interpolymers of ethylene, styrene and at least one α-olefin containing from 3 to 8 carbon atoms.

The substantially random interpolymer A) contains from about 35 to about 89.5, preferably from about 45 to about 85, more preferably from about 45 to about 80, and most preferably from about 50 to about 70 mole percent of at least one aliphatic α-olefin and from about 10.5 to about 65, preferably from about 15 to about 55, more preferably from about 20 to about 55, and most preferably from about 30 to about 50 mole percent of at least one vinyl or vinylidene aromatic monomer and/or sterically hindered aliphatic or cycloaliphatic vinyl or vinylidene monomer.

The substantially random interpolymer D) contains from about 50 to about 99.5, preferably from about 65 to about 99, more preferably from about 72 to about 98, and most preferably from about 82 to about 95 mole percent of at least one aliphatic α-olefin and from about 0.5 to about 50, preferably from about 1 to about 35, more preferably from about 2 to about 28, and most preferably from about 5 to about 18 mole percent of at least one vinyl or vinylidene aromatic monomer and/or sterically hindered aliphatic or cycloaliphatic vinyl or vinylidene monomer. The molar percentage of the one or more α-olefin monomers in the substantially random interpolymer D) is at least about 10 mole percent higher, preferably at least about 15 mole percent higher than the molar percentage of the one or more α-olefin monomers in the substantially random interpolymer A). For example, when the molar percentage of the one or more α-olefin monomers in the substantially random interpolymer A) is 50 percent, then the molar percentage of the one or more α-olefin monomers in the substantially random interpolymer D) is at least 60 percent, preferably at least 65 percent.

The percentage of the vinyl or vinylidene aromatic monomer and/or sterically hindered aliphatic or cycloaliphatic vinyl or vinylidene monomer can be determined by NMR.

The substantially random interpolymers usually contain from 0 to about 20 mole percent of other polymerizable ethylenically unsaturated monomer(s).

The melt index $I_2$ of the substantially random interpolymers according to ASTM D 1238 Procedure A, condition E, generally is from about 0.01 to about 100 g/10 min., preferably from about 0.1 to about 25 g/10 min., more preferably from about 0.5 to about 15 g/10 min.

The glass transition temperature (Tg) of the substantially random interpolymer A) is preferably from about 0° C. to about +45° C., preferably from about +15° C. to about +35° C. The Tg of the substantially random interpolymer D) is preferably from about −40° C. to about +5° C., preferably from about −25° C. to about −10° C., measured according to differential scanning calorimetry (DSC) at 10 deg C/min.

The density of the substantially random interpolymers is generally about 0.930 g/cm$^3$ or more, preferably from about 0.930 to about 1.045 g/cm$^3$, more preferably from about 0.930 to about 1.040 g/cm$^3$, most preferably from about 0.930 to about 1.030 g/cm$^3$. The molecular weight distribution, $M_w/M_n$ is generally from about 1.5 to about 20, preferably from about 1.8 to about 10, more preferably from about 2 to about 5.

While preparing the substantially random interpolymers, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the substantially random interpolymer, if desired, by extraction techniques such as selective precipitation from solution with a non solvent for either the substantially random interpolymer or the vinyl or vinylidene aromatic homopolymer. For the purpose of the present invention it is preferred that no more than 30 weight percent, preferably less than 20 weight percent, based on the total weight of the interpolymers of atactic vinyl or vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques. The substantially random interpolymers may also be modified by various chain extending or cross-linking processes including, but not limited to peroxide-, silane-, sulfur-, radiation-, or azide-based cure systems. A full description of the various cross-linking technologies is described in U.S. Pat. No. 5,869,591 and EP-A-778,852, the entire contents of both of which are herein incorporated by reference. Dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in EP-A-514,828; as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl(idene) aromatic interpolymers can also be prepared by the methods described in JP 07/278230 employing compounds shown by the gneral formula

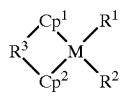

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl(idene) aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, page 25 (September 1992).

Also suitable are the substantially random interpolymers which comprise at least one α-olefin/vinyl aromatic/vinyl aromatic/α-olefin tetrad disclosed in WO-98/09999-A by Francis J. Timmers et al. These interpolymers can be prepared by conducting the polymerization at temperatures of from about −30° C. to about 250° C. in the presence of catalysts as those disclosed in WO-98/09999-A. Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl)zirconium 1,4-diphenyl-1,3-butadiene, racemic-(dimethylsilanediyl)-bis-(2-methyl-4-phenylindenyl)zirconium di-C1–4 alkyl, racemic-(dimethylsilanediyl)-bis-(2-methyl-4-phenylindenyl) zirconium di-C1–4 alkoxide, or any combination thereof. It is also possible to use the following titanium-based constrained geometry catalysts, [N-(1,1-dimethylethyl)-1,1-dimethyl-1-[(1,2,3,4,5-h)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-h)-1-indenyl)(tert-butylamido) dimethylsilane titanium dimethyl; and ((3-isopropyl)(1,2,3,4,5-h)-1-indenyl)(tert-butylamido)dimethylsilane titanium dimethyl, or any combination thereof.

Further preparative methods for the substantially random interpolymers used in the present invention have been described in the literature. Longo and Grassi (*Makromol. Chem.*, Volume 191, pages 2387 to 2396 [1990]) and D'Anniello et al. (*Journal of Applied Polymer Science*, Volume 58, pages 1701 to 1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc.,Div.Polym.Chem.*, volume 35, pages 686, 687 [1994]) have reported copolymerization using a $MgCl_2/TiCl_4/NdCl_3/Al$ $(iBu)_3$ catalyst to give random copolymers of styrene and propylene. Lu et al. (*Journal of Applied Polymer Science*, volume 53, pages 1453 to 1460 [1994]) have described the copolymerization of ethylene and styrene using a $TiCl_4/NdCl_3/MgCl_2/Al$ $(Et)_3$ catalyst. Sernetz and Mulhaupt, (*Macromol. Chem. Phys.*, volume 197, pages 1071 to 1083 [1997]) have described the influence of polymerization conditions on the copolymerization of styrene with ethylene using $Me_2Si(Me_4Cp)$ (N-tert-butyl) $TiCl_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.* Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki Kagaku Kogyo KK. All the above methods disclosed for preparing the substantially random interpolymer are incorporated herein by reference.

The polymer composition of the present invention additionally contains B) one or more polyolefins selected from the group consisting of I) propylene polymers and II) high density polyethylenes in the amounts indicated further above. A propylene polymer is the preferred component B) of the polymer composition of the present invention. It has been found that the best scuffing resistance is achieved when the substantially random interpolymer A) and the optional substantially random interpolymer D) form a co-continuous phase with component B).

Useful propylene homo- or interpolymers are known in the art. Suitable examples of propylene homopolymers or interpolymers are isotactic polypropylene, propylene-ethylene random interpolymers or interpolymers of propylene and at least other α-olefin containing from 4 to about 8 carbon atoms. Preferred comonomers include 1-20 butene, 4-methyl-1-pentene, 1-hexene, and 1-octene. The propylene interpolymer may also contain, in addition to the α-olefin, one or more non-aromatic monomers interpolymerizable therewith, such as $C_4$–$C_{20}$ dienes, preferably butadiene or 5-ethylidene-2-norbornene. Propylene interpolymers contain more than about 50 mole pecent of interpolymerized propylene. The propylene polymer generally has a melt flow rate (MFR), measured according to ISO 1133 at 230° C., in the range of from about 1 to about 100, preferably from about 4 to about 100, more preferably from about 10 to about 80 grams per 10 minutes.

Useful high density polyethylenes are linear high density polyethylene polymers (HDPE) made using Ziegler polymerization processes, for example as described in U.S. Pat. No. 4,076,698 (Anderson et al.), sometimes called heterogeneous polymers. HDPE consists mainly of long linear polyethylene chains. The HDPE employed in the present composition usually has a density of at least 0.94 g/cm³ as determined by ASTM Test Method D 1505, and a melt index (ASTM-1238, condition E) in the range of from 0.5 to 100, and preferably from 1 to 50 grams per 10 minutes.

The polymer composition of the present invention additionally contains C) a non-ionic lubricant in the amount indicated further above.

Useful non-ionic lubricants include, but are not limited to, for example, aromatic or aliphatic hydrocarbon oils, as well as esters, amides, alcohols and acids of such oils, for example, mineral oils, naphthenic oils, paraffinic oils, glycerol monostearate, pentaerythritol monooleate, erucamide, stearamides, adipic acid, sebacic acid, styrene-alpha-methyl styrene, natural oils such as castor, corn, cottonseed, olive, rapeseed, soybean, sunflower, other vegetable and animal oils, as well as esters, alcohols, and acids of the oils, polyether polyols or waxes, such as polyethylene waxes. Preferred are glycols, silicone polymers or fluoro-containing polymers. Most preferably, the lubricant in the composition of the present invention is a silicone polymer, preferably a silicone oil, which is optionally mixed with one or more additional lubricants. The polymer composition of the present invention may contain an ionic lubricant in addition to the non-ionic lubricant. The amount of the ionic lubricant, if present, is generally up to about 5 percent, more preferably up about 2 percent, most preferably up to about 1 percent, based on the total weight of A), B), C) and D). Exemplary of ionic lubricants are salt derivatives of aromatic or aliphatic hydrocarbon oils, such as magnesium stearate, calcium stearate or zinc stearate.

The preferred polymer composition of the present invention comprises, based on the total weight of A), B), C) and D), A) from about 25 to about 79.8 percent of a substantially random interpolymer comprising in polymerized form i) from about 50 to about 70 mole percent of ethylene and optionally one or more α-olefins containing from 3 to 8 carbon atoms and ii) from about 30 to about 50 mole percent of styrene;

B) from about 20 to about 45 percent of one or more polyolefins selected from the group consisting of I) propylene homo- or interpolymers having a melt flow rate (MFR) of from about 10 to about 50 grams per 10 minutes and II) high density polyethylenes; and C) from about 0.2 to about 6 percent of a non-ionic lubricant, preferably a polymeric lubricant, such as a fluoro-containing polymer or, most preferably, a silicone polymer; and D) from 0 to about 45 percent of a substantially random interpolymer comprising in polymerized form i) from about 82 to about 95 mole percent of ethylene and optionally one or more α-olefins containing from 3 to 8 carbon atoms and ii) from about 5 to about 18 mole percent of styrene.

The polymer composition of the present invention may optionally contain, based on the total weight of the above-described components A), B), C) and D), up to about 80 weight percent, preferably up to about 60 weight percent, more preferably up to about 40 weight percent, most preferably up to about 15 weight percent, of one or more additional polymers which are not within the above-described definitions of components A), B), C) and D).

Preferred additional polymers include homopolymers or interpolymers of one or more monovinyl or monovinylidene aromatic monomers, interpolymers of one or more monovinyl or monovinylidene aromatic monomers and one or more monomers interpolymerizable therewith other than an aliphatic α-olefin, homopolymers or interpolymers of aliphatic $C_{2-20}$-α-olefins other than polypropylenes and high density polyethylene (HDPE), homopolymers or interpolymers of aliphatic $C_{2-20}$-α-olefins containing polar groups or interpolymers of $C_{2-20}$-α-aliphatic α-olefins and of aliphatic $C_{2-20}$-α-olefins containing polar groups. Homopolymers or interpolymers of one or more monovinyl or monovinylidene aromatic monomers are preferred.

Suitable monovinyl or monovinylidene aromatic monomers are represented by the following formula:

Formula IV

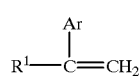

wherein $R^1$ and Ar have the meanings stated in formula I further above. Exemplary monovinyl or monovinylidene aromatic monomers are those listed under formula I further above, particularly styrene.

Examples of suitable interpolymerizable comonomers other than a monovinyl or monovinylidene aromatic monomer include, for example, $C_4$–$C_6$ conjugated dienes, especially butadiene or isoprene. In some cases it is also desirable to copolymerize a cross-linking monomer such as a divinyl benzene into the monovinyl or monovinylidene aromatic polymer.

The polymers of monovinyl or monovinylidene aromatic monomers with other interpolymerizable comonomers preferably contain, polymerized therein, at least 50 percent by weight and, preferably, at least 90 percent by weight of one or more monovinyl or monovinylidene aromatic monomers.

Other examples of optional polymers are homopolymers or interpolymers of aliphatic α-olefins having from 2 to 20, preferably 2 to 18, more preferably 2 to 12, carbon atoms or α-olefins having from 2 to 20, preferably 2 to 18, more preferably 2 to 12, carbon atoms and containing polar groups other than polypropylenes or high density polyethylene (HDPE).

Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate, glycidyl acrylate or glycidyl methacrylate; ethylenically unsaturated dicarboxylic acid imides, such as N-alkyl or N-aryl maleimides, such as N-phenyl maleimide, etc. Preferably such monomers containing polar groups are acrylic acid, vinyl acetate, maleic anhydride and acrylonitrile. Halogen groups that can be included in the polymers with aliphatic α-olefin monomers include fluorine, chlorine and bromine; preferably such polymers are chlorinated polyethylenes (CPEs) or polyvinyl chloride.

Preferred are copolymers of ethylene or propylene and at least one of acrylic acid, vinyl acetate, maleic anhydride or acrylonitrile; preferably ethylene-vinyl acetate copolymers, or ethylene-acrylic acid copolymers.

Suitable examples of homopolymers or interpolymers of aliphatic α-olefins having from 2 to 20 carbon atoms are homopolymers of ethylene and interpolymers of ethylene and one or more other α-olefins having from 3 to 8 carbon atoms, such as ethylene-propylene interpolymers or ethylene-1-octene interpolymers. The olefinic polymer may also contain, in addition to the α-olefin, one or more non-aromatic monomers interpolymerizable therewith, such as $C_4$–$C_{20}$ dienes, preferably butadiene or 5 ethylidene-2-norbornene.

One class of olefinic polymers is generally produced by a high pressure polymerization process using a free radical initiator resulting in the traditional long chain branched low density polyethylene (LDPE). LDPE usually has a density of less than 0.94 g/cc (ASTM D 792) and a melt index of from 0.01 to 100, and preferably from 0.1 to 50 grams per 10 minutes (as determined by ASTM Test Method D 1238, condition E).

Another class is that of the linear olefin polymers which have an absence of long chain branching, as the traditional linear low density polyethylene polymers (heterogeneous LLDPE). A further class is that of the uniformly branched or homogeneous polymers (homogeneous LLDPE including those made as described in U.S. Pat. No. 3,645,992 (Elston), and those made using single-site catalysts in a reactor having relatively high olefin concentrations, as described in U.S. Pat. Nos. 5,026,798 and 5,055,438 (Canich). The homogeneous or heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in the present invention. These polymers have processability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,380,810; 5,272,236 and 5,278,272, which are incorporated herein by reference. The density of the SLOP as measured in accordance with ASTM D-792 is generally from 0.85 g/cc to 0.97 g/cc, preferably from 0.85 g/cc to 0.955 g/cc, and especially from 0.85 g/cc to 0.92 g/cc. The melt index, according to ASTM D-1238, Condition 190° C./2.16 kg (also known as $I_2$), of the SLOP is generally from 0.01 g/10 min. to 1000 g/10 min., preferably from 0.01 g/10 min. to 100 g/10 min., and especially from 0.01 g/10 min. to 10 g/10 min.

The polymer composition may contain one or more additives, for example antioxidants, such as hindered phenols or phosphites; colorants, pigments, light stabilizers, such as hindered amines; ignition resistant additives, pigments, viscosity modifiers, antistatic additives, or crosslinking agents, such as peroxides or silanes. If the additives are comprised in the polymer composition, they are employed in functionally equivalent amounts known to those skilled in the art, generally in amounts of up to about 30, preferably from about 0.01 to about 5, more preferably from about 0.02 to about 1 percent by weight, based upon the total weight of components A), B), C) and optionally D).

The polymer composition of the present invention may additionally comprise a filler. The preferred amount of the filler, if present, greatly varies depending on the desired stiffness of the material made from the polymer composition of the present invention. Generally the weight ratio between I) the filler and II) the total weight of components A), B), C) and D) is from about 20:1 to about 1:20, preferably from about 9:1 to about 1:9. Useful fillers include organic and inorganic fillers, such as saw dust, cellulosic fillers, such as wood flour or wood fibers, paper fibers, corn husks, straw, cotton, carbon black or graphite, talc, calcium carbonate, flyash, alumina trihydrate, silica/glass, glass fibers, marble dust, cement dust, clay, feldspar, silica or glass, fumed silica, alumina, magnesium oxide, antimony oxide, zinc oxide, barium sulfate, aluminum silicate, calcium silicate, Kaolin, titanium dioxide, silicium dioxide, titanates, glass microspheres, chalk, alumina trihydrate, magnesium hydroxide. Of these fillers barium sulfate, talc, calcium carbonate, Kaolin (aluminium silicate), alumina, titanium dioxide, alumina trihydrate, magnesium hydroxide and mixtures thereof are preferred. The term "a filler" as used herein includes a mixture of different fillers.

The above-described substantially random interpolymer (s) A), the component(s) B) and the lubricant(s) C) can be combined with the optional interpolymer D) and optional additives and processed to a molded article by any suitable means known in the art such as, but not limited to, Banbury mixing, extrusion compounding, roll milling, calendering, compression molding, injection-molding, extrusion, extrusion-coating or blow-molding. All components can be mixed at room temperature and can then be molten. However, it is often preferred to mix and at least partially melt the substantially random interpolymer(s) A) and the component(s) B) and to add the lubricant(s) C) later to this at least partially molten blend. Useful temperatures for processing the above-described components A), B) and C) in combination with the optional interpolymer D) and optional additives generally are from about 80° C. to about 300° C., preferably from about 100° C. to about 250° C., more preferably from about 120° C. to about 200° C.

Preferably films or sheets are produced which preferably have a thickness of from about 0.025 mm to about 25 mm, more preferably from about 0.1 mm to about 10 mm. Mono- and multilayer articles can be produced. If the molded article comprises two or more layers, at least one layer is made from the polymer composition of the present invention. In multilayer articles the layer which comprises the polymer composition of the present invention is preferably the top layer to provide good resistance to scuffing and/or good polishing properties to the multilayer articles. However, the multilayer articles may additionally contain a coating layer on top of the layer made of the composition of the present invention. Such additional coating layer is for example a temporary transportation protection layer or a wear protection layer, such as a polyurethane or an acrylic-based polymer layer or a wax layer.

The polymer composition of the present invention has good resistance to scuffing and/or displays high gloss upon polishing. Accordingly, the polymer composition of the present invention is particularly useful in furniture, cars, car bumpers, boats, toys, household machines, such as vacuum cleaners, floor coverings, wall coverings, shoes, for example ski boots, skates, inline skates, roller blades or hiking boots, bottles and luggage, such as suit-cases.

The following examples are provided to illustrate the present invention. The examples are not intended to limit the scope of the present invention and they should not be so interpreted. Amounts are in weight parts or weight percentages unless otherwise indicated.

TESTING

The properties of the polymers and blends are determined by the following test procedures.

The Melt Index (MI) of the ethylene/styrene interpolymers is determined by ASTM D-1238 (1979), Condition E (190° C.; 2.16 kg)

The styrene content in the ethylene/styrene interpolymers is determined by NMR. The terms "mol % styrene" and "wt. % styrene" in the examples refer to the styrene content in the ethylene/styrene interpolymer.

The Melt Index (MI) of the High Density Polyethylenes (HDPE) is determined by ASTM D-1238, condition E (190° C., 2.16 kg)

The Melt Flow Rate (MFR) of the propylene polymers is measured according to ISO 1133 at 230° C.

Scuffing Resistance

The Scuffing Resistance measures how many times and under what load a rubber can pass over a polymer sheet to be tested without leaving any visible scuff marks. It is measured in a friction apparatus which is equipped with an abrasive paper of roughness P600 which is fixed in such a manner that the rubber first slides over the abrasive paper over a distance of 2 cm before it slides over the sheet to be tested. The sheet to be tested has the dimensions of 40 cm×38 cm and 2 mm thickness. The rubber is an Astral rubber, which corresponds to a cross-linked shoe sole rubber. The sheet to be tested is wiped with ethanol before the test. After testing the sheet is first cleaned with a dry tissue and then with ethanol again. The scuff index below indicates under what load and how many times the rubber glides over the polymer sheet without leaving any visible scuff marks.

| Test Series | Scuff index |
| --- | --- |
| 9 kg load, 6 times | 54 (exposure 6 × 9 kg) |
| 6 kg load, 4 times | 24 |
| 5 kg load, twice | 10 |
| 4 kg load, once | 4 |
| 3 kg load, once | 3 |
| Scuff marks at 3 kg load | 0 |

Polishing

The polishing performance is described by measuring the gloss of a polymeric sheet after polishing with polymeric fiber pads which are coated with crosslinked adhesives that contain varying amounts of abrasives. First the polymeric sheet is polished using a moderately abrasive Scotch-Brite (Trademark) red pad followed by polishing using a non-abrasive Scotch-Brite (Trademark) white pad. The Scotch-Brite red pad and the Scotch-Brite white pad are commercially available from the 3M company. The gloss of the polished polymeric sheets is measured according to ASTM D-523 in gloss units. The term "gloss" is used to express the property of surfaces to reflect directed light. The gloss values recorded in the Examples further below are obtained using a BYK Gardner micro-TRI-gloss gloss meter at 60 degree angle of incidence.

PREPARATION OF ETHYLENE/STYRENE INTERPOLYMERS ESI-1 TO ESI-7

The interpolymer is prepared in a continuously operating loop reactor (36.8 gal, 140 L). An Ingersoll-Dresser twin screw pump provides the mixing. The reactor runs liquid full at 475 psig (3,275 kPa) with a residence time of approximately 25 minutes. Raw materials and catalyst/cocatalyst flows are fed into the suction of the twin screw pump through injectors and Kenics static mixers. The catalyst/cocatalyst is a three component system, that is a titanium catalyst, an aluminum catalyst component and a boron co-catalyst. The titanium catalyst is (1H-cyclopenta[1] phenanthrene-2-yl) dimethyl(t-butylamido)-silanetitanium 1,4-diphenylbutadiene). It is prepared as described below. The aluminum catalyst component is a commercially available modified methalumoxane Type 3A (MMAO-3A). The boron cocatalyst is tris(pentafluorophenyl)borane. The molar ratio between the boron/titanium catalyst and the aluminum/titanium catalyst is listed in Table 1A below. The twin screw pump discharges into a 2" (5 cm) diameter line which supplies two Chemineer-Kenics 10–68 Type BEM Multi-Tube heat exchangers in series. The tubes of these exchangers contain twisted tapes to increase heat transfer. Upon exiting the last exchanger, loop flow returns through the injectors and static mixers to the suction of the pump. Heat transfer oil is circulated through the exchangers' jacket to control the loop temperature probe located just prior to the first exchanger. The exit stream of the loop reactor is taken off between the two exchangers. The flow and solution density of the exit stream is measured by a micromotion.

Solvent feed to the reactor is supplied by two different sources. A fresh stream of toluene from an 8480-S-E Pulsafeeder diaphragm pump with rates measured by a micromotion flowmeter is used to provide flush flow for the reactor seals (20 lb/hr (9.1 kg/hr). Recycle solvent is mixed with uninhibited styrene monomer on the suction side of five 8480–5-E Pulsafeeder diaphragm pumps in parallel. These five Pulsafeeder pumps supply solvent and styrene to the reactor at 650 psig (4,583 kPa). Fresh styrene flow is measured by a micromotion flowmeter, and total recycle solvent/styrene flow is measured by a separate micromotion flowmeter. Ethylene is supplied to the reactor at 687 psig (4,838 kPa). The ethylene stream is measured by a micromotion mass flowmeter. A Brooks flowmeter/controller is used to deliver hydrogen into the ethylene stream at the outlet of the ethylene control valve. The ethylene/hydrogen mixture combines with the solvent/styrene stream at ambient temperature. The temperature of the entire feed stream as it enters the reactor loop is lowered to 2° C. by an exchanger with −10° C. glycol on the jacket. Preparation of the three catalyst components take place in three separate tanks: fresh solvent and concentrated catalyst/cocatalyst premix are added and mixed into their respective run tanks and fed into the reactor via variable speed 680-S-AEN7 Pulsafeeder diaphragm pumps. As previously explained, the three component catalyst system enters the reactor loop through an injector and static mixer into the suction side of the twin screw pump. The raw material feed stream is also fed into the reactor loop through an injector and static mixer downstream of the catalyst injection point but upstream of the twin screw pump suction.

Polymerization is stopped with the addition of catalyst kill (water mixed with solvent) into the reactor product line after the micromotion flowmeter measuring the solution density. A static mixer in the line provides dispersion of the catalyst kill and additives in the reactor effluent stream. This stream next enters post reactor heaters that provide additional energy for the solvent removal flash. This flash occurs as the effluent exits the post reactor heater and the pressure is dropped from 475 psig (3,275 kPa) down to 450 mmHg (60 kPa) of absolute pressure at the reactor pressure control valve. This flashed polymer enters the first of two hot oil jacketed devolatilizers. The volatiles flashing from the first devolatizer are condensed with a glycol-jacketed exchanger, passed through the suction of a vacuum pump, and are discharged to the solvent and styrene/ethylene separation vessel. Solvent and styrene are removed from the bottom of this vessel as recycle solvent while ethylene exhausted from the top. The ethylene stream is measured with a micromotion mass flowmeter. The measurement of vented ethylene plus a calculation of the dissolved gases in the solvent/styrene stream are used to calculate the ethylene conversion. The polymer and remaining solvent separated in the devolatilizer is pumped with a gear pump to a second devolatizer. The pressure in the second devolatizer is operated at 5 mmHg (0.7 kPa) absolute pressure to flash the remaining solvent. This solvent is condensed in a glycol heat exchanger, pumped through another vacuum pump, and exported to a waste tank for disposal. The dry polymer (<1000 ppm total volatiles) is pumped with a gear pump to an underwater pelletizer with 6-hole die, pelletized, spin-dried, and collected in 1000 lb (454 kg) boxes.

TABLE IA

| Polymer | molar ratio boron/Ti catalyst | molar ratio Al/Ti catalyst |
|---|---|---|
| ESI-1 | 4.4:1 | 16:1 |
| ESI-2 | 5.1:1 | 8.1:1 |
| ESI-3 | 4:1 | 6:1 |
| ESI-4 | 5:1 | 15.5:1 |
| ESI-5 | 4:1 | 5.9:1 |
| ESI-6 | 6:1 | 12:1 |
| ESI-7 | 5.6:1 | 15.5:1 |

Preparation of the Titanium Catalyst: (1H-cyclopenta[1]phenanthrene-2-yl)dimethyl (t-butylamido)-silanetitanium 1,4-diphenylbutadiene)

1) Preparation of lithium 1H-cyclopenta[1]phenanthrene-2-yl

To a 250 ml round bottom flask containing 1.42 g (0.00657 mole) of 1H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl)dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[1]phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3. Preparation of (1H-cyclopenta[1]phenanthrene-2yl)dimethyl(t-butylamino)silane To a 500 ml round bottom flask containing 1.98 g (0.0064 mole) of (1H-cyclopenta[1]phenanthrene-2-yl)dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4. Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5. Preparation of (1H-cyclopenta[1]phenanthrene-2-yl)dimethyl(t-butylamido)silanetitanium dichloride To a 250 ml round bottom flask containing 1.17 g (0.0030 mole) of $TiCl_3o3THF$ and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20 °C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6. Preparation of (1H-cyclopenta[1]phenanthrene-2-yl)dimethyl(t-butylamido)silanetitanium 1,4-diphenylbutadiene To a slurry of (1H-cyclopenta[1]phenanthrene-2yl)dimethyl(t-butylamido)silanetitanium dichloride (3.48 g, 0.0075 mole) and 1.551 gm (0.0075 mole) of 1,4-diphenyllbutadiene in about 80 ml of toluene at 70 °C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurred in 60 ml of mixed hexanes at about 20 °C. for approximately 16 hours. The mixture was cooled to about −25 °C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

The monomer amounts and polymerization conditions are provided in Table 1B. The polymer properties are provided in Table 1C.

TABLE 1B

| | Reactor Temp. | Solvent Flow | | Ethylene Flow | | Hydrogen Flow | Styrene Flow | | Ethylene reactor Conversion |
|---|---|---|---|---|---|---|---|---|---|
| | °C. | lb/hr | kg/hr | lb/hr | Kg/hr | SCCM* | lb/hr | kg/hr | % |
| ESI-1 | 73 | 485 | 220 | 33 | 15 | 250 | 130 | 59 | 93 |
| ESI-2 | 80 | 164 | 74 | 27 | 12 | 170 | 155 | 70 | 96 |
| ESI-3 | 100 | 432 | 196 | 64 | 29 | 650 | 36 | 16 | 97 |
| ESI-4 | 66 | 450 | 205 | 25 | 11 | 0 | 144 | 66 | 94 |
| ESI-5 | 105 | 357 | 162 | 60 | 27 | 899 | 31 | 14 | 96 |
| ESI-6 | 83 | 391 | 178 | 41 | 19 | 25 | 82 | 37 | 93 |
| ESI-7 | 66 | 214 | 97 | 26 | 12 | 0 | 145 | 66 | 95 |

TABLE 1B-continued

| Reactor Temp. | Solvent Flow | | Ethylene Flow | | Hydrogen Flow | Styrene Flow | | Ethylene reactor Conversion |
|---|---|---|---|---|---|---|---|---|
| ° C. | lb/hr | kg/hr | lb/hr | Kg/hr | SCCM* | lb/hr | kg/hr | % |

*cc/min., standardized to 1 atm (760 torr) and 0° C.

TABLE 1C

| | Melt Index | Styrene in ethylene/styrene Interpolymer (NMR) | |
|---|---|---|---|
| Inter-Polymer | g/10 min | mol % (calc.). | wt. % |
| ESI-1 | 1.0 | 38.9 | 70.3 |
| ESI-2 | 9.9 | 47.0 | 76.7 |
| ESI-3 | 0.4 | 10.7 | 30.7 |
| ESI-4 | 0.9 | 46.8 | 76.6 |
| ESI-5 | 1.1 | 10.3 | 29.9 |
| ESI-6 | 0.5 | 28.8 | 60.0 |
| ESI-7 | 1.0 | 46.7 | 76.5 |

The components used for preparing the Examples and Comparative Examples are described in more detail in Table 2 below.

TABLE 2

| Designation | Characterization/composition |
|---|---|
| ESI-1 | MI 1.0 g/10 min.; 70.3 wt. % (38.9 mol%)styrene |
| ESI-2 | MI 9.9 g/10 min.; 76.7 wt. % (47.0 mol%)styrene |
| ESI-3 | MI 0.4 g/10 min.; 30.7 wt. % (10.7 mol%)styrene |
| ESI-4 | MI 0.9 g/10 min.; 76.6 wt. % (46.8 mol%)styrene |
| ESI-5 | MI 1.1 g/10 min.; 10.3 wt. % (29.9 mol%)styrene |
| ESI-6 | MI 0.5 g/10 min.; 60.0 wt. % (28.8 mol%)styrene |
| ESI-7 | MI 1 g/10 min.; 76.5 wt. % (46.7 mol%)styrene |
| PP-H-2 | Propylene homopolymer, MFR 1.8 g/10 min., available as INSPIRE H100-01 (Trademark of The Dow Chemical Company) |
| PP-H-25 | Propylene homopolymer, MFR 25 g/10 min., available as INSPIRE H502-25RG (Trademark of The Dow Chemical Company) |
| PP-H-52 | Propylene homopolymer, MFR 52 g/10 min., available as INSPIRE H512-52RNA (Trademark of The Dow Chemical Company) |
| PP-C-70 | Copolymer of propylene and ethylene, MFR 70 g/10 min., available as INSPIRE C711-70RNA (Trademark of The Dow Chemical Company) |
| HQ-770J | Propylene homopolymer, MFR 25 g/10 min., commercially available from Borealis |
| HDPE-I | High density polyethylene, commercially available as HDPE KS 10100 from The Dow Chemical Company, density 0.955 g/cm³, MI 4 g/10 min. |
| HDPE-II | High density polyethylene, commercially available as HD04452N from The Dow Chemical Company, density 0.95 g/cm³, MI 4 g/10 min. |
| LUB-I | Concentrate of 25 weight parts of an ultra high molecular weight siloxane in 75 weight parts of a linear low density polyethylene; the concentrate is commercially available as Dow Corning (Trademark) MB25-302 Masterbatch |
| LUB-II | Fluoropolymer, commercially available from the 3M company under the trademark Dynamar FX-5920A |
| LUB-III | Fluoropolymer, commercially available from DuPont under the trademark Viton Free Flow SC fluoropolymer |
| LUB-IV | Polyethylene glycol, commercially available as Polyglycol E8000 from The Dow Chemical Company, MW 8,000. |
| SLOP | A substantially linear olefin polymer, commercially available from The Dow Chemical Company under the trademark Affinity FW 1650 POP, density 0.902 g/cm³, MI 3 g/10 min. (measured according to ASTM D-1238, Condition 190° C./2.16 kg) |
| PS | Polystyrene, commercially available as Styron 665 (Trademark) from The Dow Chemical Company |
| DOP | Dioctyl phthalate plasticizer |
| Filler-I | Filler consisting of 40% of dolomite, 34% of calcium carbonate and 26% of Kaolin. The filler is commercially available as Lupolen UM 201 (Trademark) |
| Zytocal | Trademark for calcium carbonate in polyolefin at a weight ratio of 9:1, commercially available from ECC International |

EXAMPLES 1 TO 22 AND COMPARATIVE EXAMPLES A TO E

Sheets of 2 mm thickness are produced by compounding the components of the polymer composition described in Table 3 below on a Buss co-kneader or directly on a two roll mill and calendering the composition on a two roll mill to prepare the raw sheet of 2–4 mm thickness using the following calendering parameters:

Temperature on front roll: 180–190° C.

Temperature on rear roll: 170–185° C.

Friction (rpm difference): –20%.

The raw sheet is subjected to compression molding at 190° C. using a pre-pressure of 8 Bar for 6 minutes and a final pressure of 200 Bar for 4 minutes to produce sheets of 2 mm thickness.

The polymer compositions are listed in Table 3 below. All Examples comprise, in addition to the components listed in Table 3, an additive package consisting of 0.2 percent zinc stearate as an ionic lubricant, 0.2 percent Irganox 1010 (trademark) stabilizer and 0.16 percent Irgafos 12 (Trademark) stabilizer, based on the total weight of components A), B) and D. In addition to these additives, Examples 6, 7 and 18 contain an additional amount of 0.2 percent zinc stearate and Example 21 contains an additional 0.3 percent zinc stearate, based on the total components A), B) and D.

TABLE 3

| (Comp.) Example | Component A) (wt. parts) | Component B) (wt. parts) | Component C)*) | Component D) (wt. parts) | Further additive (wt. parts) | Scuff Index |
|---|---|---|---|---|---|---|
| A | 20 ESI-1 + 10 ESI-2 | — | LUB-I | 30 ESI-3 | — | 0 |
| 1 | 20 ESI-1 + 10 ESI-2 | 7 PP-H-25 | LUB-I | 30 ESI-3 | — | 3.5 |
| 2 | 20 ESI-1 + 10 ESI-2 | 15 PP-H-25 | LUB-I | 30 ESI-3 | — | 17 |
| 3 | 20 ESI-1 + 10 ESI-2 | 20 PP-H-25 | LUB-I | 30 ESI-3 | — | 39 |
| 4 | 20 ESI-1 + 10 ESI-2 | 30 PP-H-25 | LUB-I | 30 ESI-3 | — | 54 |
| 5 | 18.3 ESI-1 + 9.2 ESI-2 | 45 PP-H-25 | LUB-I | 27.5 ESI-3 | — | 24 |
| 6 | 13.3 ESI-1 + 6.7 ESI-2 | 60 PP-H-25 | LUB-I | 20 ESI-3 | — | 4 |
| 7 | 8.3 ESI-1 + 4.2 ESI-2 | 75 PP-H-25 | LUB-I | 12.5 ESI-3 | — | 4 |
| B | — | 75 PP-H-25 | LUB-I | — | — | 3.5 |
| C | 20 ESI-1 + 10 ESI-2 | 30 PP-H-25 | — | 30 ESI-3 | — | 2 |
| 8 | 70 ESI-1 | 30 PP-H-25 | LUB-I | — | — | 10 |
| D | 70 ESI-1 | 30 PP-H-25 | — | — | — | 0 |
| 9 | 70 ESI-3 | 30 PP-H-25 | LUB-I | — | — | 7 |
| 10 | 20 ESI-1 + 10 ESI-2 | 49 PP-H-2 | LUB-I | 30 ESI-3 | — | 10 |
| 11 | 20 ESI-1 + 10 ESI-2 | 49 PP-H-52 | LUB-I | 30 ESI-3 | — | 17 |
| 12 | 20 ESI-1 + 10 ESI-2 | 49 HDPE-I | LUB-I | 30 ESI-3 | — | 17 |
| E | 20 ESI-1 + 10 ESI-2 | 49 SLOP | LUB-I | 30 ESI-3 | — | 0 |
| 13 | 20 ESI-1 + 10 ESI-2 | 30 PP-H-2 | LUB-I | 30 ESI-3 | — | 3 |
| 14 | 20 ESI-1 + 10 ESI-2 | 30 PP-C-70 | LUB-I | 30 ESI-3 | — | 54 |
| 15 | 20 ESI-1 + 10 ESI-2 | 30 PP-H-25 | LUB-I | 30 ESI-3 | 10 DOP | 41 |
| 16 | 20 ESI-1 + 10 ESI-2 | 30 PP-H-25 | LUB-I | 30 ESI-3 | 10 DOP + 50 filler-I | 10 |
| 17 | 20 ESI-1 + 10 ESI-2 | 30 PP-H-25 | LUB-I | 30 ESI-3 | 10 DOP + 100 filler-I | 3.5 |
| 18 | 22.2 ESI-1 + 11.1 ESI-2 | 33.3 PP-H-52 | LUB-I | 33.3 ESI-3 | — | 10 |
| 19 | 21.1 ESI-1/ 10.6 ESI-2 | 31.7 PP-H-25 | LUB-I | 31.7 ESI-3 | — | 41 |
| 20 | 20.8 ESI-1/ 10.4 ESI-2 | 31.3 PP-H-25 | LUB-I | 31.3 ESI-3 | — | 54 |
| 21 | 20 ESI-4 + 10 ESI-7 | 30 PP-H-25 | LUB-I | 30 ESI-3 | — | 54 |
| 22 | 20 ESI-1 + 10 ESI-7 | 30 PP-H-25 | LUB-I | 30 ESI-3 | — | 54 |

*)Concentration of LUB-I: 2 weight percent, based on total weight of A), B) and D)

The comparison between Examples 1–7 and Comparative Examples A illustrates that the presence of Component B) is necessary to obtain scuff resistance. The comparison between Examples 1, 6, 7 on one hand and Examples 2–5 on the other hand illustrates that the best scuff resistance is obtained if the amount of Component B) is from about 20 to about 45 percent, based on A), B), C) and D). The compositions of Comparative Examples B has a similar scuff resistance as Examples 1, 6 and 7; however the composition of Comparative Example B has other disadvantages, such as high rigidity and insufficient impact properties. The comparison between Example 4 and Comparative Example C as well as the comparison between Example 8 and Comparative Example D illustrate the necessity of a non-ionic lubricant for obtaining good scuff resistance. The comparison between Examples 5, 10–12 and Comparative Example E illustrate that good scuff resistance is obtained when the polymer composition of the present invention contains a polypropylene or HDPE, but that an ethylene polymer with a lower density is not suitable instead of a polypropylene or HDPE. The comparison between Examples 4, 13 and 14 illustrates that the best scuffing resistance is achieved when the propylene homo- or interpolymer has a melt flow rate (MFR) of from about 10 to about 80 grams per 10 minutes.

EXAMPLES 23 TO 25 AND COMPARATIVE EXAMPLES F AND G

The components of Examples 23–25 are compounded using a twin-screw extruder (Micro-18 from Am. LEISTRITZ Extruder Corp.). The Melt temperature is 200° C. Sheets of about 1.6 mm thickness are produced by compression molding of the melt-compounded compositions at 190° C. for 4 minutes. The gloss of the sheets is measured in the above described polishing test. The composition of the sheets and the results of the polishing test are listed in Table 4 below.

TABLE 4

| Example | 23 | 24 | 25 | F*) | G PVC-based commercial flooring sheet |
|---|---|---|---|---|---|
| Composition (wt. parts) | | | | | |
| ESI-1 (Component A)) | 35 | 35 | — | — | |
| ESI-4 (Component A)) | — | — | 35 | — | |
| HG-770J (Component B)) | 28 | 28 | 28 | 28 | |
| HDPE-II (Component B)) | 17 | 17 | 17 | 17 | |
| LUB-II (Component C)) | 1 | 1 | 1 | 1 | |
| PS | — | 11 | — | — | |
| Zytocal | 14 | 2 | 14 | 14 | |
| Kaolin | 5 | 1 | 5 | 5 | |
| ESI-5 (Component D)) | | | | 35 | |
| Gloss after polishing: x seconds with Scotch-Brite red pad, then x seconds with Scotch-Brite white pad | | | | | |
| 60 s red | 24 | 22 | 19 | 8.4 | 6.9 |
| 60 s red, 10 s white | 26 | 31 | 26 | 13 | 11 |
| 60 s red, 20 s white | 28 | 34 | 27 | 14 | 13 |
| 60 s red, 30 s white | 31 | 38 | 29 | 18 | 13 |
| 60 s red, 60 s white | 35 | 40 | 35 | 21 | 14 |

*)Not an Example of the invention, but not prior art.

The results in Table 4 illustrate that the sheets prepared from the polymer composition of the present invention achieve a faster and higher gloss that the commercially available sheets of Comparative Example G.

Comparative Example F, which contains only a substantially random interpolymer D) but not a substantially random interpolymer A), achieves less good gloss results than Examples 23–25 but better results than Comparative Example G.

EXAMPLES 26 TO 30 AND COMPARATIVE EXAMPLE G

Sheets of about 3.1 mm are produced as described for Examples 23–25 above. The gloss of the sheets is measured in the above described polishing test. The composition of the sheets and the results of the polishing test are listed in Table 5 below.

TABLE 5

| Example | 27 | 28 | 29 | 30 | 31 | G pvc-based flooring sheet |
|---|---|---|---|---|---|---|
| Composition (wt. parts) | | | | | | |
| ESI-1 (Component A)) | 46 | 46 | 10 | 10 | 8 | |
| ESI-6 (Component A)) | — | — | 36 | 34 | 26 | |
| HG-770J (Component B)) | 16 | — | 10 | 9 | 8 | |
| HDPE-II (Component B)) | — | 16 | 10 | 9 | 8 | |
| LUB-II (Component C)) | — | 1 | 1 | 1 | 1 | |
| LUB-III (Component C)) | 1 | — | — | — | — | |
| LUB-IV (Component C)) | — | — | — | 6 | 5 | |
| PS | 16 | 16 | 32 | 30 | 24 | |
| Zytocal | 20 | 20 | — | — | 19 | |
| Gloss after polishing x seconds with Scotch-Brite red pad, then x seconds with Scotch-Brite white pad | | | | | | |
| —(starting gloss) | 4.1 | 5.2 | 4.6 | 4.9 | 4.3 | 3.9 |
| 15 s red | 10 | 16 | 12 | 11 | 12 | 8 |
| 15 s red, 10 s white | 23 | 26 | 22 | 20 | 26 | 16 |
| 15 s red, 20 s white | 26 | 28 | 28 | 25 | 31 | 17 |
| 15 s red, 30 s white | 29 | 30 | 29 | 26 | 34 | 18 |
| 15 s red, 60 s white | 34 | 32 | 32 | 29 | 41 | 19 |

The results in Table 5 illustrate that the sheets prepared from the polymer composition of the present invention achieve a faster and higher gloss that the commercially available sheet of Comparative Example G.

What is claimed is:

1. A polymer composition comprising, based on the total weight of A), B), C) and D), A) from about 10 to 89.99 percent of a substantially random interpolymer comprising in polymerized form i) from about 35 to about 89.5 mole percent of one or more α-olefin monomers and ii) from about 65 to about 10.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s);

B) from about 10 to about 75 percent of one or more polyolefins selected from the group consisting of I) propylene polymers comprising more than about 50 mole percent of interpolymerized propylene and II) high density polyethylenes; and C) from 0.01 to about 10 percent of a non-ionic lubricant selected from the group consisting of glycols, silicone polymers and fluoro-containing polymers; and D) from 0 to about 60 percent of a substantially random interpolymer comprising in polymerized form i) from about 50 to about 99.5 mole percent of one or more α-olefin monomers and ii) from about 50 to about 0.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s) with the proviso that the molar percentage of the one or more α-olefin monomers in the substantially random interpolymer D) is at least about 10 mole percent higher than the molar percentage of the one or more α-olefin monomers in the substantially random interpolymer A).

2. The polymer composition of claim 1 comprising from about 20 to 79.95 percent of component A), from about 20 to about 50 percent of component B), from 0.05 to about 8 percent of component C) and from 0 to about 45 percent of component D), based on the total weight of A), B), C) and D).

3. The polymer composition of claim 2 comprising from about 25 to about 79.8 percent of component A), from about 20 to about 45 percent of component B), from about 0.2 to about 6 percent of component C) and from 0 to about 45 percent of component D), based on the total weight of A), B), C) and D).

4. The polymer composition of claim 3 comprising from about 40 to about 79.8 percent of component A), from about 20 to about 45 percent of component B), from about 0.2 to about 6 percent of component C), and from 0 to about 10 percent of component D), based on the total weight of A), B), C) and D).

5. The polymer composition of claim 3 comprising from about 25 to about 45 percent of component A), from about 20 to about 45 percent of component B), from about 0.2 to about 6 percent of component C), and from about 25 to about 45 percent of component D), based on the total weight of A), B), C) and D).

6. The polymer composition of claim 1 wherein said substantially random interpolymer A) contains interpolymerized
   (i) from about 45 to about 85 mole percent of one or more α-olefin monomers and
   (ii) from about 15 to about 55 mole percent of one or more vinyl or vinylidene aromatic monomers and/or one or more sterically hindered aliphatic or cycloaliphatic vinyl or vinylidene monomers, and
   optionally iii) other polymerizable ethylenically unsaturated monomer(s).

7. The polymer composition of claim 6 wherein said substantially random interpolymer A) contains interpolymerized
   (i) from about 50 to about 70 mole percent of one or more α-olefin monomers and
   (ii) from about 30 to about 50 mole percent of one or more vinyl or vinylidene aromatic monomers and/or one or more sterically hindered aliphatic or cycloaliphatic vinyl or vinylidene monomers, and
   optionally iii) other polymerizable ethylenically unsaturated monomer(s).

8. The polymer composition of claim 1 wherein component B) is a propylene homo- or interpolymer.

9. The polymer composition of claim 1 wherein the propylene homo- or interpolymer has a melt flow rate (MFR) of from about 10 to about 80 grams per 10 minutes.

10. The polymer composition of claim 1 wherein the non-ionic lubricant C) is a polyethylene glycol.

11. The polymer composition of claim 1 wherein the lubricant is a silicone polymer or a fluoro-containing polymer.

12. The polymer composition of claim 1 wherein said substantially random interpolymer D) contains interpolymerized
   (i) from about 65 to about 99 mole percent of one or more α-olefin monomers and
   (ii) from about 1 to about 35 mole percent of one or more vinyl or vinylidene aromatic monomers and/or one or more sterically hindered aliphatic or cycloaliphatic vinyl or vinylidene monomers, and
   optionally iii) other polymerizable ethylenically unsaturated monomer(s).

13. The polymer composition of claim 12 wherein said substantially random interpolymer D) contains interpolymerized
   (i) from about 82 to about 95 mole percent of one or more α-olefin monomers and
   (ii) from about 5 to about 18 mole percent of one or more vinyl or vinylidene aromatic monomers and/or one or more sterically hindered aliphatic or cycloaliphatic vinyl or vinylidene monomers, and
   optionally iii) other polymerizable ethylenically unsaturated monomer(s).

14. The polymer composition of claim 1 wherein the molar percentage of the one or more α-olefin monomers in the substantially random interpolymer D) is at least about 15 mole percent higher than the molar percentage of the one or more α-olefin monomers in the substantially random interpolymer A).

15. The polymer composition of claim 1 wherein said substantially random interpolymers A) and D) are interpolymers of ethylene and styrene or interpolymers of ethylene, styrene and at least one α-olefin containing from 3 to 8 carbon atoms.

16. The polymer composition of claim 1 comprising, based on the total weight of A), B), C) and D),
   A) from about 25 to about 79.8 percent of a substantially random interpolymer comprising in polymerized form i) from about 50 to about 70 mole percent of ethylene and optionally one or more α-olefins containing from 3 to 8 carbon atoms and ii) from about 30 to about 50 mole percent of styrene;
   B) from about 20 to about 45 percent of one or more polyolefins selected from the group consisting of I) propylene homo- or interpolymers having a melt flow rate (MFR) of from about 10 to about 50 grams per 10 minutes and II) high density polyethylenes; and
   C) from about 0.2 to about 6 percent of a non-ionic lubricant; and
   D) from 0 to about 45 percent of a substantially random interpolymer comprising in polymerized form i) from about 82 to about 95 mole percent of ethylene and optionally one or more α-olefins containing from 3 to 8 carbon atoms and ii) from about 5 to about 18 mole percent of styrene.

17. The polymer composition of claim 1 comprising additionally up to about 80 weight percent, based on the total weight of components A), B), C), D), of one or more polymers selected from the group consisting of homopolymers and interpolymers of one or more monovinyl or monovinylidene aromatic monomers and interpolymers of one or more monovinyl or monovinylidene aromatic monomers and one or more monomers interpolymerizable therewith other than an aliphatic α-olefin.

18. The polymer composition of claim 1 comprising additionally a filler, the weight ratio between I) the filler and II) the total weight of components A), B), C) and D) being from about 20:1 to about 1:20.

19. The filled polymer composition of claim 18 wherein the filler is calcium carbonate, Kaolin, alumina trihydrate, magnesium hydroxide and a mixture thereof.

20. A molded article, at least made partially from a polymer composition comprising, based on the total weight of A), B), C) and D),
   A) from about 10 to 89.99 percent of a substantially random interpolymer comprising in polymerized form i) from about 35 to about 89.5 mole percent of one or more α-olefin monomers and ii) from about 65 to about 10.5 mole percent of one or more vinyl or vinylidene aromatic monomers and/or one or more sterically hindered aliphatic or cycloaliphatic vinyl or vinylidene monomers, an optionally iii) other polymerizable ethylenically unsaturated monomer(s);

B) from about 10 to about 75 percent of one or more polyolefins selected from the group consisting of I) propylene polymers comprising more than about 50 mole percent of interpolymerized propylene and II) high density polyethylenes; and C) from 0.01 to about 10 percent of a non-ionic lubricant selected from the group consisting of glycols, silicone polymers and fluoro-containing polymers; and D) from 0 to about 60 percent of a substantially random interpolymer comprising in polymerized form i) from about 50 to about 99.5 mole percent of one or more α-olefin monomers and ii) from about 50 to about 0.5 mole percent of one or more vinyl or vinylidene aromatic monomers and/or one or more sterically hindered aliphatic or cycloaliphatic vinyl or vinylidene monomers, and optionally iii) other polymerizable ethylenically unsaturated monomer(s) with the proviso that the molar percentage of the one or more α-olefin monomers in the substantially random interpolymer D) is at least about 10 mole percent higher than the molar percentage of the one or more α-olefin monomers in the substantially random interpolymer A).

21. The molded article of claim 20 wherein the polymer composition additionally comprises a filler, the weight ratio between I) the filler and II) the total weight of components A), B), C) and D) being from about 20:1 to about 1:20.

22. The molded article of claim 20 being in the shape of a film or a sheet.

23. The molded article of claim 20 comprising two or more layers wherein at least one layer is made from the polymer composition set forth in claim 20.

24. The molded article of claim 20 prepared by calendering, compression molding, injection-molding, extrusion, extrusion-coating or blow-molding.

25. The multilayer article of claim 20 being selected from the group consisting of furniture, cars, car bumpers, boats, toys, household machines, floor coverings, wall coverings, shoes, bottles and luggage.

26. A process for preparing a molded article wherein the polymer composition of claim 1 is processed to the molded article by calendering, compression molding, injection-molding, extrusion, extrusion-coating or blow-molding.

* * * * *